(12) United States Patent
Doty et al.

(10) Patent No.: US 6,388,260 B1
(45) Date of Patent: May 14, 2002

(54) SOLID STATE NEUTRON DETECTOR AND METHOD FOR USE

(75) Inventors: F. Patrick Doty, Livermore, CA (US); Ilya Zwieback, New Milford; Warren Ruderman, Demarest, both of NJ (US)

(73) Assignee: Sandia Corporation, Livermore, CA (US)

(*) Notice: Subject to any disclaimer, the term of this patent is extended or adjusted under 35 U.S.C. 154(b) by 0 days.

(21) Appl. No.: 09/519,130

(22) Filed: Mar. 6, 2000

(51) Int. Cl.[7] ................................................. G01T 3/06
(52) U.S. Cl. ......................... 250/390.01; 250/390.04; 250/390.11; 250/370.04; 250/370.05
(58) Field of Search ....................... 250/390.04, 390.11, 250/390.01, 370.04, 370.05

(56) References Cited

U.S. PATENT DOCUMENTS

| | | | |
|---|---|---|---|
| 3,812,364 A | * 5/1974 | Higatsberger et al. | 250/390.04 |
| 4,419,578 A | * 12/1983 | Kress | 250/390.01 |
| 5,734,166 A | * 3/1998 | Czirr | 250/390.11 |
| 5,940,460 A | * 8/1999 | Seidel et al. | 250/390.01 |

* cited by examiner

*Primary Examiner*—Constantine Hannaher
*Assistant Examiner*—Andrew Israel
(74) *Attorney, Agent, or Firm*—Timothy P. Evans

(57) ABSTRACT

Crystals of lithium tetraborate or alpha-barium borate had been found to be neutron detecting materials. The crystals are prepared using known crystal growing techniques, wherein the process does not include the common practice of using a fluxing agent, such as sodium oxide or sodium fluoride, to reduce the melting temperature of the crystalline compound. Crystals prepared by this method can be sliced into thin single or polycrystalline wafers, or ground to a powder and prepared as a sintered compact or a print paste, and then configured with appropriate electronic hardware, in order to function as neutron detectors.

26 Claims, 3 Drawing Sheets

SOLID STATE NEUTRON DETECTOR AND METHOD FOR USE

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

1. Field of the Invention

This invention relates to a bulk composition suitable for counting individual neutrons. More particularly, the present invention is drawn to a specific material which is sensitive to neutron radiation and which can comprise a semiconducting substrate to act as a 3-dimensional detector array.

2. Description of the Prior Art

Conventional neutron detectors typically include devices that operate as ionization chambers or proportional counters, both of which use a neutron active gas such as $BF_3$ or He. Upon absorption of neutrons, such gases release energetic reaction particles. These particles produce ionization in the surrounding gas which are detected by appropriately biased electrodes. Other detectors coat the walls of the ionization chamber with a solid neutron active material such as $^6Li$, $^{10}B$, or $^{235}U$. These materials also absorb neutrons and release particles that produce ionization.

One class of solid state neutron detectors detect electron-hole pairs that cross a semiconductor junction. The electron-hole pairs are produced by reaction particles formed as result of neutron absorption within films or dopants of neutron active material incorporated within the detector. One such solid state neutron detector is disclosed in U.S. Pat. No. 3,227,876 to Ross, which includes a silicon semiconductor having a layer doped with boron. Neutrons are absorbed by the boron layer, thereby creating energetic reaction particles that, in turn, create electron-hole pairs that diffuse into and across the junction to produce a current pulse. The detector may be encapsulated by a layer of hydrogenous moderator material a few centimeters thick in order to reduce the speed of incoming neutrons. Such detectors are susceptible to radiation damage and are not capable of operating at temperatures above 30° or 40° C. for extended periods of time, making them unsuitable for use in high temperature, high radiation environments.

U.S. Pat. No. 3,805,078 to Kozlov discloses a solid state neutron detector including at least one layer of diamond crystal.

U.S. Pat. No. 4,419,578 to Kress discloses another solid state neutron detector that uses a hydrogen containing semiconductor material.

A major problem with prior art neutron detectors is the sensitivity of the detector to non-neutronic components of the radiation field, particularly gamma ray sensitivity. Lithium glass scintillators, although generally less efficient, are an effective means for detecting low-energy neutrons and find wide application in neutron scattering research. However, lithium glass scintillators also suffer from a sensitivity to gamma-rays where the presence of a background radiation is large in relationship to a flux of neutrons. In such instances, the gamma sensitivity of Li-glass simulates a neutron capture event in Li-glass and since there is no effective technique for separating the gamma signal from the neutron signal (for coincidental multiple photon events with total energy deposition in the vicinity of the capture peak) the quality of the data obtained is seriously degraded.

Neutron scattering research facilities require a detector system that is efficient, fast, and gamma insensitive. None of the detector systems currently used by researchers meet all these requirements.

SUMMARY OF INVENTION

In accordance with the principles of the invention, a new neutron detector has been developed which overcomes the disadvantages of the prior art scintillation or gas-phase detectors. The neutron detector in accordance with the invention relies upon single or polycrystalline, boron-containing compounds, useful for neutron detection. The $^{10}B(n, alpha)$ reaction possesses a large cross section for neutron capture and produces nuclear decay fragments which are at once heavy and energetic. The present invention takes advantage of the relatively short distances over which the energy of these heavy ion decay products is dissipated within crystals of the boron-containing compound to permit using moderately thin though still structurally robust wafers for detecting the presence of neutrons. Also possible are articles prepared from powders of the boron compound prepared by the instant process: thin sintered wafers prepared by comminuting the boron compound of the present invention to a powder, mixing the powder with binder agents and sintering it, or thin layers of pastes prepared by mixing a comminuted powder of the boron compound with wetting and/or dispersing agents and laid down by a printing process.

Because of the reduced need for large volume crystals the detector is rendered inherently less sensitive to background gamma-ray radiation due to the comparatively large mean-free-path lengths for these energetic photons to dissipate their energy. Thin or very small crystals result in most of this radiation passing undetected through these crystals and thereby strongly discriminating against gamma background events.

The borate materials described in the instant invention provide a high boron atomic density, and is conveniently formed into single or polycrystalline boules. The specific variation of these materials which is useful for providing the desired neutron detection response is prepared by INRAD Corp. in a process which avoids the use of a flux, typically sodium oxide or a fluoride, in the growth of the crystal boules. Crystalline material fabricated by standard industry processes using sodium oxide or fluoride fluxes have been found to provide virtually no response to impressed neutron radiation. It is believed, therefore, that the observed behavior of crystal boules fabricated by the fluxless process is the result of substantially reduced impurity levels.

DETAILED DESCRIPTION OF THE INVENTION

Figure 1:
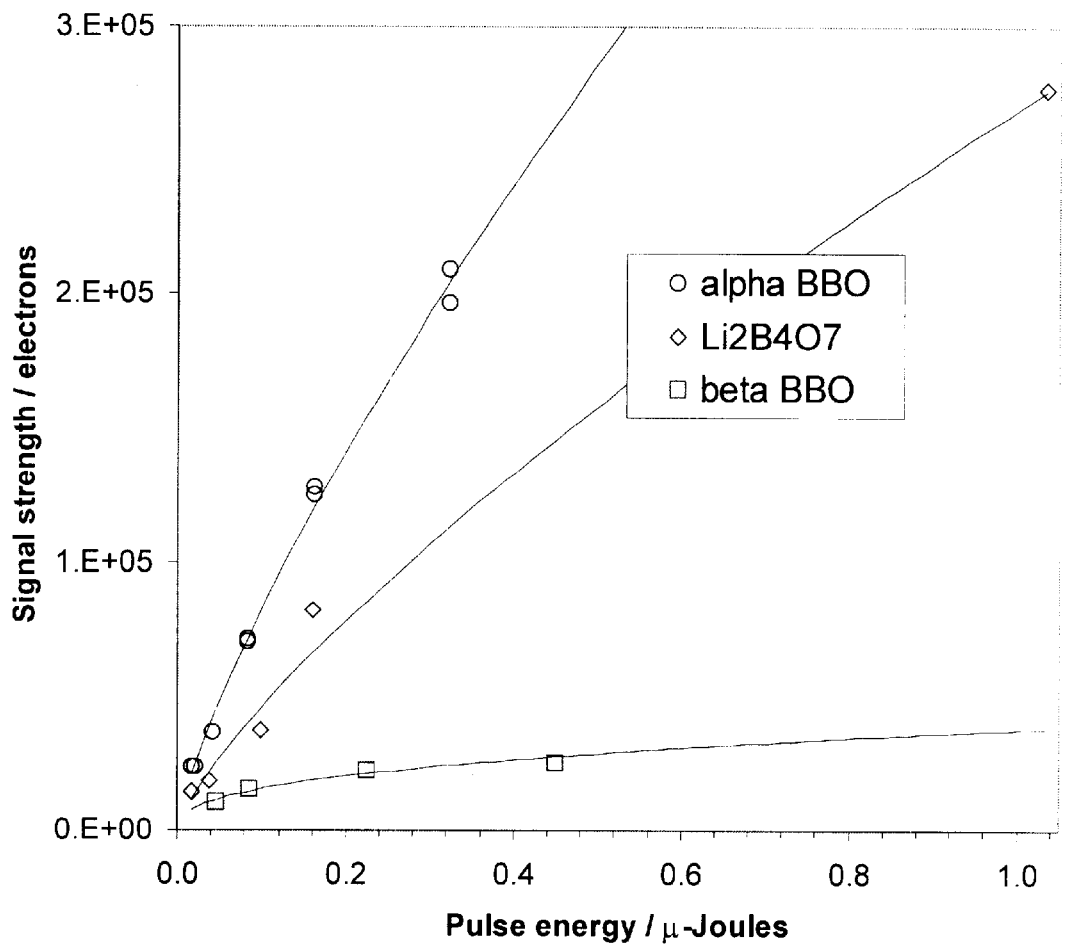
FIG. 1. Illustrates the response of various borates composition to radiation produced by 3 MeV protons on lithium gallate.

Disclosed herein are inorganic crystalline salts that have been found to exhibit semiconductor properties in the presence of ionizing radiation such as neutron radiation. These materials have been found to provide a measurable electrical response proportional to the amount of radiation striking crystals of the material and therefore can act as suitable neutron radiation detectors.

In general, materials of this type would not be expected to exhibit substantial electronic conduction. They are not considered to be semiconductors but are rather inorganic oxide salts with a high ionic component. Unlike an ionic crystal, an intrinsic semiconductor exhibits covalent bonding wherein electrons are "shared" between adjacent bonded atoms. Furthermore, semiconductors are characterized by a band gap between the material's valence and conduction bands that is typically no more than a few electron-volts (eV).

Because this gap is so low, electrons can easily pass from the valance band into the conduction band when excited. A consequence of this "promotion" of valence electrons is to free these excited electrons to "drift" under the influence of an externally applied electric field and to act as charge carriers to conduct current. Additionally, for each electron that is promoted out of the valance band, a positively charged "hole" is created in the covalent bond by the departing electron. Charge neutrality is, therefore, maintained by the creation of these electron-hole pairs. Because of the ease with which electrons can migrate in these materials, electrons in adjacent bonds can "jump" to fill a "hole" and thereby create a second hole at one unit cell removed from the first. Holes, therefore, can "drift" through the lattice of the semiconductor much like excited electrons such that both electrons and holes can conduct current.

However, electron-hole pairs can be created in semiconductors by a number of other mechanisms including the interaction of various forms of energetic radiation, such as alpha or beta particles, and electromagnetic radiation, such as gamma or x-rays. Because the material of the present invention comprises crystals containing boron, and in one case lithium, which are both known to exhibit high neutron cross sections and since both produce alpha particles and other ions as the result of the neutron capture process, materials containing boron or boron and lithium might be considered as suitable candidates for investigation as neutron detectors regardless of their status as non-semiconducting materials.

The materials of the present invention comprise crystals grown from melts of borate compounds. Specifically, crystals of either alpha or beta phase barium borates or of lithium tetraborate have been investigated. Given their high intrinsic resistivities, the high boron density per unit cell, the high nuclear cross-section of boron, and the nature of the decay products resulting from neutron capture by boron, one would tend to expect that these materials might act as effective detectors for neutron radiation.

This has not been found to be the case in crystals grown by conventional means. The well-known Czochralski process is widely used to cheaply produce single crystal boules. Generally speaking, however, a flux, such as sodium oxide or sodium fluoride, is used to help lower the melting temperature of the host material and to help control the incipient crystal phase which is precipitated from the melt as it freezes around a "seed" crystal. When borate crystals are prepared by this conventional process which incorporates a flux, little or no discernable signal is observed when these crystals are subjected to a pulsed stream of neutron radiation.

Materials were ranked quantitatively using a proton beam method. and two new candidate materials, lithium tetraborate ($Li_2B_4O_7$) and α barium borate (αBBO) were found to have markedly better charge collection than β BBO. Neutrons produced in the proton beam by the $^7Li(p,n)^7Be$ reaction were observed. The gamma flux was reduced by choice of target materials. Radiation produced in this way was used to test the candidate materials. Pulse response was observed, corroborating the material property measurements.

Quantitative Material Property Testing

The quantitative evaluation and ranking of candidate materials was performed using the above mentioned proton beam stimulus. Thin carbon paint electrodes were used to contact the specimens, which ranged in thickness from 300 microns to 1 mm. Both pulse and current mode sensing were demonstrated. Lithium tetraborate ($Li_2B_4O_7$) and a barium borate (αBBO), are similar to lithium triborate ($LiB_3O_5$ or LBO) and β BBO, but exhibit markedly better electron transport properties. Estimates of mobility-lifetime products of generated carriers were made for these materials, however significant de-trapping of carriers complicated the analysis.

Typical results for are shown in FIG. 1. The results were normalized by adjusting the relative signal strengths to correct for specimen thickness and beam current variations. Analysis of these and additional data indicate an effective electron $\mu\tau$ product of approximately $10^{-6}$ cm$^2$/volt for the α phase of BBO. Since the resistivity of this material is high ($>10^{11}$ Ωcm), this is well above the threshold theoretically required for detection of single thermal neutrons in a practical device.

Pulse transient analyses on the borate crystals show that shallow traps dominate the response, resulting in a "persistent current" or afterglow-like effect, lasting 10–100 $\mu$s after the stimulus is removed. Since the shaping time for the pulse amplifier is 1–10 $\mu$s, only a small fraction of the charge is collected during the measurement in these crystals. therefore, nonlinear response to large ($\mu$-Joule) proton pulses, as seen in FIG. 1, results in underestimates for electron transport properties.

Neutron Response Testing

Figure 2:
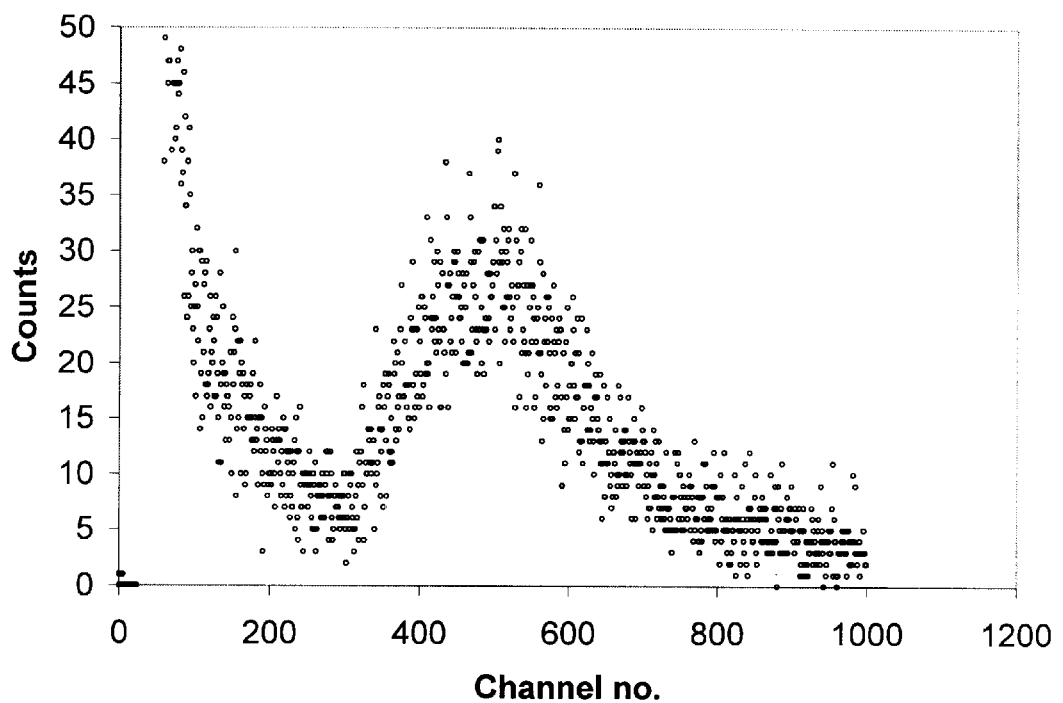
FIG. 2. Illustrates the response of α BBO to radiation produced by 3 MeV protons on lithium gallate. Amplifier shaping time is 10 μs.

To test for neutron response in the borate crystals a pulsed beam of neutrons was produced by placing various materials in a proton ion beam. LiF was proposed first as the target material. Fluorine reactions, however, produced a large quantity of high-energy gamma rays, which swamp the modest neutron signal as measured with a CdZnTe detector. When lithium gallate was used as 30 the target, however, this background was largely eliminated. Neutrons were detected outside the vacuum chamber (about ½ meter from the source) at the rate of 6 mR/hr with a beam current of 8 nA. The gamma rate measured with a pancake probe at this location was about 0.08 mR/hr. All of the crystals were tested under these conditions. Results for an α BBO crystal are shown in FIG. 2 as a typical of these crystals. The Compton edge can be seen below channel 300, and a strong response peak is seen centered at about channel number 525. The count rate was about 10 cps on average, and was dependent on both shaping time and detector bias.

As indicated above, the measured response of $Li_2B_4O_7$ and α and β BBO crystals to the pulsed neutron beam is summarized in FIG. 1. Not shown are results for lithium and barium borate crystals that were grown in the conventional manner with a sodium oxide or sodium fluorine flux. In these cases, virtually no signal response could be detected.

PREFERRED EMBODIMENT

Detectors & Detector Array

Figure 3:
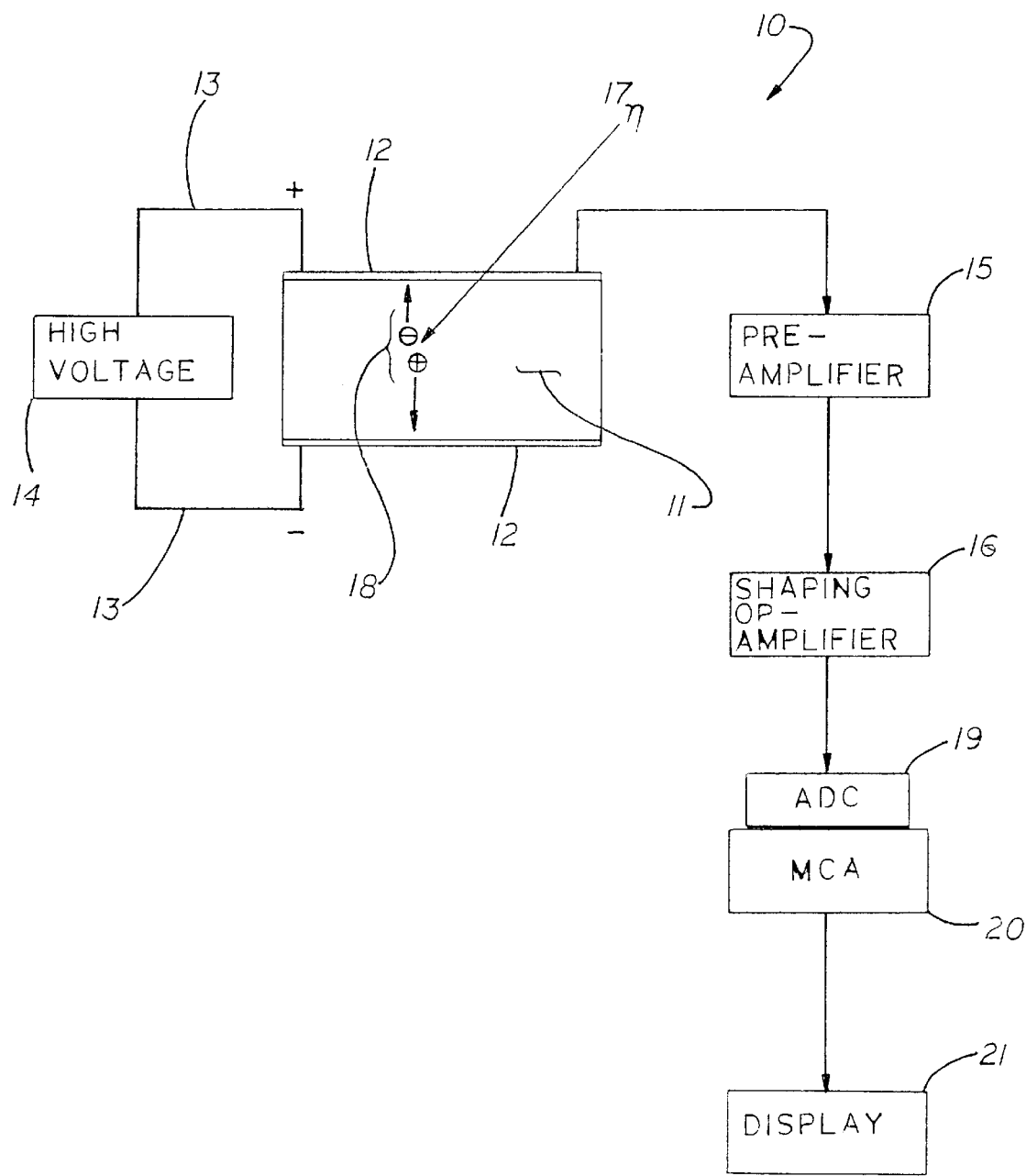
FIG. 3. Illustrates a block diagram schematic of the detector sensor of the present invention.

Applicants herein disclose a new use for known borate compositions: specifically, crystals of lithium tetraborate or alpha-barium borate, which have been grown from the melt without the use of a flux, are observed to provide a discernable signal response in the presence of a pulsed beam of thermal neutron radiation. As noted above the current technology for detecting thermal neutrons relies upon bulky and expensive helium gas filled tubes. The present invention, however, discloses the use of a solid, crystalline material composed of a high concentration of elements having a substantial neutron capture cross-section. A detector based on the crystals of the present invention, therefore, will offer many advantages over the current state-of-the-art. In particular, a detector array based on lithium borate or barium borate crystals could be fabricated into nearly any shape or size. Applicants contemplate individual detectors or a detector array comprising a number of small, individual wafers of lithium tetraborate or alpha-phase barium borate and supporting electronics, as shown in FIG. 3. These wafers may be either single or polycrystalline or they may be sintered composites containing a dispersion of very small crystalline grains.

Finally, a detector array comprising a plurality of these detectors, arranged in planar, cylindrical, or spherical geometries, in order to provide the detection coverage desired is also contemplated. This capability leads to the result that high resolution 3D imaging is possible since the geometries can be layered in an overlapping net-like fashion.

Applicants therefore, disclose a neutron detector 10 comprising a wafer 11 of crystalline or polycrystalline lithium tetraborate or alpha-phase barium borate, as shown in FIG. 3. Each wafer 11 is prepared with electrodes 12 that are plated or deposited onto opposing surface of the wafer 11. Each electrode 12 is attached to an electrical lead 13 connecting the electrode to a source of high voltage 14. The analyzer circuit is completed by attaching a preamplifier 15 followed by a pulse shaping amplifier 16 to one the electrodes on each crystal.

As wafer 11 is exposed to a neutron flux 17, some of the neutrons are captured by the boron contained within the lattice of the crystals comprising wafer 11 to create $^7Li$ and an energetic alpha particle (~2.8 MeV) as shown below.

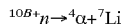

To a lesser extent, lithium in the lithium tetraborate crystals will also contribute to the capture reaction by,

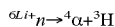

but, the nuclear cross section of lithium is only about 25% that of boron, (941 barns vs. 3838 barns) and the atomic concentration of lithium in the tetraborate crystal. is only half that of boron.

The energy carried by the alpha particles is now deposited into the crystal lattice ionizing one or more of the surrounding atoms and thereby creating a number of mobile electron-hole pairs 18. These positive and negative charge carriers are free to drift toward the electrode of opposite charge, under the influence of the applied high voltage field, where a small step-change in voltage is recorded with each event. This signal is amplified and then passed to operational amplifier 16 where the signal is integrated to form a shaped pulse whose height is proportional to its relative energy.

Output pulses from the shaping amplifier 16 are directed to a digitizer (ADC) 19, and multi-channel analyzer (MCA) 20 which digitizes the pulse height of each of the signal pulses received from the shaping amplifier and then accumulates each of those digital signals in channel numbers corresponding to the magnitude of the digitized signal. The signal spectrum output of MCA 20 consists of one or more broad peaks, corresponding to the energies of the neutron capture reaction, or reactions, presented on oscilloscope display 21, or some similar display medium. As seen in FIG. 2, and as noted earlier, a single broad peak is observed at about channel number 525 under the experimental conditions used.

While the most obvious embodiment of the present invention is drawn to a single crystal, it is not necessarily the most desirable approach. As noted above wafer 11 is also possible as a sinter composite formed to any desired shape. The crystalline boule may be comminuted into a powder, mixed with any of a number of binders to aid in sintering, pressed into a 'green' shape and then sintered at a temperature of about 0.75–0.9 of the material melting temperature. The article might also be prepared by known hot-pressing techniques with or with out binders.

In addition, wafer 11 also could comprise a screen printed layer of a paste formed by mixing a comminuted powder of the crystalline boule with any of a number of wetting and/or dispersing (suspension)agents. The printed layer would be placed onto a electrically conductive substrate acting as a charge collecting electrode. After drying the printed layer a second electrode would be placed onto the top surface of the layer.

These approaches are operable because each of the grains comprising the powder used to produce the paste or the sintered composite are themselves one or more crystals of the original crystalline boule. The powder is, in turn, prepared so that a plurality of the grains remain in electrical contact with each other and with electrodes 12.

What is claimed is:

1. A neutron detector, comprising crystals of a barium borate compound, wherein said crystals are grown from a melt consisting essentially of a stoichiometric composition of barium, boron and oxygen.

2. The neutron detector of claim 1, wherein the barium borate is alpha-barium borate.

3. The neutron detector of claim 1, further comprising electrodes, said electrodes for collecting electric charges.

4. The neutron detector of claim 2, wherein said crystals are cut to form a wafer having opposing first and second faces, and wherein said electrodes are placed onto said first and second faces.

5. The neutron detector of claim 4, wherein said wafer has a thickness of less than about 1 mm.

6. The neutron detector of claim 1, wherein said crystals further comprise a sintered wafer, said sintered wafer comprising a comminuted powder of said crystals.

7. The neutron detector of claim 1, wherein said crystals further comprise a paste suspension, said paste suspension comprising a comminuted form of said crystals and one or more wetting and/or suspension agents.

8. A neutron detector, comprising crystals of a lithium borate compound, wherein said crystals are grown from a melt consisting essentially of a stoichiometric composition of boron, lithium, and oxygen.

9. The neutron detector of claim 8, wherein the lithium borate is lithium tetraborate ($Li_2B_4O_7$).

10. The neutron detector of claim 8, further comprising electrodes, said electrodes for collecting electric charges.

11. The neutron detector of claim 10, wherein said crystals are cut to form a wafer having opposing first and second faces, and wherein said electrodes are placed onto said first and second faces.

12. The neutron detector of claim 11, wherein said wafer has a thickness of less than about 1 mm.

13. The neutron detector of claim 8, wherein said crystals further comprise a sintered wafer, said sintered wafer comprising a comminuted powder of said crystals.

14. The neutron detector of claim 8, wherein said crystals further comprise a paste suspension, said paste suspension comprising a comminuted form of said crystals and one or more wetting and/or suspension agents.

15. A detector array comprising a plurality of neutron detectors, wherein each said detector comprises a barium borate compound grown from a melt consisting essentially of a stoichiometric composition of barium, boron and oxygen.

16. (amended) The detector array of claim 15, wherein the barium borate compound is alpha-barium borate.

17. The detector array of claim 16, wherein the array comprises a planar, a cylindrical, or a spherical geometry.

18. A detector array comprising a plurality of neutron detectors, wherein each said detector comprises a lithium borate compound grown from a melt consisting essentially of a stoichiometric composition of lithium, boron, and oxygen.

19. The neutron detector of claim 18, wherein the lithium borate compound is lithium tetraborate ($Li_2B_4O_7$).

20. The detector array of claim 19, wherein the array comprises a planar, a cylindrical, or a spherical geometry.

21. A method for making a neutron sensitive detector, the method comprising the steps of:
   a.) providing a quantity of material consisting essentially of either a pure barium borate compound or a pure lithium borate compound;
   b.) heating said material, in an atmosphere containing oxygen, to a temperature sufficient to melt said material, said material melted without the aid of a flux;
   c.) crystallizing said melt thereby forming a crystalline or polycrystalline boule, and
   e) preparing said boule to provide a thin detector portion, said detector portion exhibiting a measurable electric signal response in the presence of neutrons.

22. The process of claim 21, wherein the barium borate is alpha-barium borate.

23. The process of claim 21, wherein the lithium borate compound is lithium tetraborate ($Li_2B_4O_7$).

24. The process of claim 21, wherein the step of preparing comprises cutting the boule into wafers and providing electrodes onto said wafer.

25. The process of claim 21, wherein the step of preparing comprises comminuting the boule into a powder;

pressing and sintering said powder to provide a sintered wafer; and providing electrodes to said sintered wafer forming thereby the thin detector portion.

26. The process of claim 24, wherein the step of preparing comprises comminuting the boule into a powder; and adding one or more fugitive or non-fugitive wetting and/or suspension agents to said powder;

mixing said agents and said powder to form a suspension paste; and placing said paste onto an electrically conductive substrate;

drying said paste; and providing electrodes to said dried paste and substrate wafer forming thereby the thin detector portion.

* * * * *